United States Patent
Breeden, Jr.

(10) Patent No.: US 8,595,096 B2
(45) Date of Patent: Nov. 26, 2013

(54) PRIORITIZING CHECKS FOR ELECTRONIC CHECK PROCESSING

(75) Inventor: Benjamin T. Breeden, Jr., Eldersburg, MD (US)

(73) Assignee: Federal Reserve Bank of Richmond, Richmond, VA (US)

( * ) Notice: Subject to any disclaimer, the term of this patent is extended or adjusted under 35 U.S.C. 154(b) by 1581 days.

(21) Appl. No.: 11/983,033

(22) Filed: Nov. 6, 2007

(65) Prior Publication Data

US 2008/0159655 A1     Jul. 3, 2008

Related U.S. Application Data

(60) Provisional application No. 60/857,666, filed on Nov. 7, 2006.

(51) Int. Cl.
*G06Q 40/00* (2012.01)

(52) U.S. Cl.
USPC .................................. 705/35; 705/39

(58) Field of Classification Search
USPC ................................................ 705/35
See application file for complete search history.

(56) References Cited

U.S. PATENT DOCUMENTS

| | | | |
|---|---|---|---|
| 4,264,808 A | 4/1981 | Owens et al. | |
| 4,270,042 A | 5/1981 | Case | |
| 4,523,330 A | 6/1985 | Cain | |
| 4,694,397 A | 9/1987 | Grant et al. | |
| 4,823,264 A | 4/1989 | Deming | |
| 4,948,174 A | 8/1990 | Thomson et al. | |
| 4,974,878 A | 12/1990 | Josephson | |
| 5,036,984 A * | 8/1991 | Labarthe | 209/3.3 |
| 5,038,283 A | 8/1991 | Caveney | |
| 5,120,944 A | 6/1992 | Kern et al. | |
| 5,121,945 A | 6/1992 | Thomson et al. | |
| 5,175,682 A * | 12/1992 | Higashiyama et al. | 705/45 |
| 5,187,750 A | 2/1993 | Behera | |
| 5,198,975 A | 3/1993 | Baker et al. | |
| 5,237,159 A | 8/1993 | Stephens et al. | |
| 5,265,007 A | 11/1993 | Barnhard, Jr. et al. | |
| 5,373,550 A | 12/1994 | Campbell et al. | |
| 5,412,190 A | 5/1995 | Josephson et al. | |
| 5,583,759 A | 12/1996 | Geer | |

(Continued)

OTHER PUBLICATIONS

Excerpt of Bank of America checking account statement, with personal information redacted. Aug. 2008.

(Continued)

*Primary Examiner* — Sarah M Monfeldt
*Assistant Examiner* — Ann Loftus
(74) *Attorney, Agent, or Firm* — King & Spalding (57) ABSTRACT

Prioritizing checks for electronic check processing based on check characteristics, such as check values, receiving institutions associated with the checks, and/or delivery methods associated with the checks. A prioritization module of a check processing system receives information regarding multiple checks in a check processing queue. The prioritization module assigns at least one priority indicator to one or more of the checks. Each priority indicator includes information regarding a characteristic of the check to which the indicator is assigned. For example, the characteristic can be the value of the check, the receiving institution associated with the check, and/or the delivery method associated with the check. Upon determining that at least one of the checks cannot be timely processed if the checks are processed on a first in, first out basis, the prioritization module re-orders the checks for processing based on the assigned priority indicators.

29 Claims, 4 Drawing Sheets

(56) References Cited

U.S. PATENT DOCUMENTS

| | | | |
|---|---|---|---|
| 5,600,732 A | 2/1997 | Ott et al. | |
| 5,668,897 A | 9/1997 | Stolfo | |
| 5,677,955 A | 10/1997 | Doggett et al. | |
| 5,680,611 A | 10/1997 | Rail et al. | |
| 5,687,250 A | 11/1997 | Curley et al. | |
| 5,689,579 A | 11/1997 | Josephson | |
| 5,692,065 A | 11/1997 | Prakash et al. | |
| 5,754,674 A | 5/1998 | Ott et al. | |
| 5,783,808 A | 7/1998 | Josephson | |
| 5,790,717 A | 8/1998 | Judd | |
| 5,819,236 A | 10/1998 | Josephson | |
| 5,832,140 A | 11/1998 | Stapleton et al. | |
| 5,930,778 A | 7/1999 | Geer | |
| 5,937,084 A | 8/1999 | Crabtree et al. | |
| 5,940,524 A | 8/1999 | Murayama et al. | |
| 5,963,654 A | 10/1999 | Prakash et al. | |
| 6,019,282 A * | 2/2000 | Thompson et al. | 235/379 |
| 6,076,074 A * | 6/2000 | Cotton et al. | 705/40 |
| 6,097,834 A | 8/2000 | Krouse et al. | |
| 6,115,509 A | 9/2000 | Yeskel | |
| 6,170,744 B1 | 1/2001 | Lee et al. | |
| 6,236,756 B1 | 5/2001 | Kimura et al. | |
| 6,243,689 B1 | 6/2001 | Norton | |
| 6,351,546 B1 | 2/2002 | Murayama et al. | |
| 6,351,553 B1 | 2/2002 | Hayosh | |
| 6,450,403 B1 | 9/2002 | Martens et al. | |
| 6,560,571 B1 * | 5/2003 | McBride | 703/14 |
| 6,571,000 B1 | 5/2003 | Rasmussen et al. | |
| 6,577,761 B1 | 6/2003 | Kanno et al. | |
| 6,585,775 B1 | 7/2003 | Cosentino et al. | |
| 6,658,139 B1 | 12/2003 | Cookingham et al. | |
| 6,717,592 B2 | 4/2004 | Gusler et al. | |
| 6,792,133 B2 | 9/2004 | Ott et al. | |
| 6,850,950 B1 | 2/2005 | Clarke et al. | |
| 6,854,656 B2 | 2/2005 | Matsumori | |
| 6,912,297 B2 | 6/2005 | Scott et al. | |
| 6,963,885 B2 | 11/2005 | Calkins et al. | |
| 6,996,263 B2 | 2/2006 | Jones et al. | |
| 7,000,828 B2 | 2/2006 | Jones | |
| 7,066,668 B2 | 6/2006 | Sandison et al. | |
| 7,066,669 B2 | 6/2006 | Lugg | |
| 7,082,216 B2 | 7/2006 | Jones et al. | |
| 7,092,560 B2 | 8/2006 | Jones et al. | |
| 7,099,845 B2 | 8/2006 | Higgins et al. | |
| 7,120,606 B1 | 10/2006 | Ranzini et al. | |
| 7,167,580 B2 | 1/2007 | Klein et al. | |
| 7,283,656 B2 | 10/2007 | Blake et al. | |
| 7,386,511 B2 | 6/2008 | Buchanan et al. | |
| 7,539,646 B2 | 5/2009 | Gilder et al. | |
| 7,546,275 B1 | 6/2009 | Herzberg et al. | |
| 2001/0039534 A1 | 11/2001 | Keene | |
| 2001/0051921 A1 | 12/2001 | Garner, IV et al. | |
| 2002/0150279 A1 | 10/2002 | Scott et al. | |
| 2002/0165754 A1 * | 11/2002 | Tang et al. | 705/9 |
| 2003/0055791 A1 * | 3/2003 | Bodie et al. | 705/62 |
| 2003/0069900 A1 * | 4/2003 | Hind et al. | 707/200 |
| 2003/0158811 A1 | 8/2003 | Sanders et al. | |
| 2003/0202690 A1 | 10/2003 | Jones et al. | |
| 2003/0208421 A1 | 11/2003 | Vicknair et al. | |
| 2003/0225644 A1 * | 12/2003 | Casati et al. | 705/35 |
| 2003/0225704 A1 | 12/2003 | Park et al. | |
| 2004/0030621 A1 | 2/2004 | Cobb | |
| 2004/0068464 A1 | 4/2004 | Buchanan et al. | |
| 2004/0109596 A1 | 6/2004 | Doran | |
| 2004/0133516 A1 | 7/2004 | Buchanan et al. | |
| 2004/0143621 A1 | 7/2004 | Fredrickson et al. | |
| 2004/0148235 A1 | 7/2004 | Craig et al. | |
| 2004/0181485 A1 * | 9/2004 | Finch et al. | 705/45 |
| 2004/0193537 A1 * | 9/2004 | Knapp | 705/39 |
| 2004/0218203 A1 | 11/2004 | Mastie et al. | |
| 2004/0236688 A1 | 11/2004 | Bozeman | |
| 2005/0018896 A1 | 1/2005 | Heit et al. | |
| 2005/0044043 A1 | 2/2005 | Gooding et al. | |
| 2005/0071283 A1 | 3/2005 | Randle et al. | |
| 2005/0080719 A1 | 4/2005 | Sellen et al. | |
| 2005/0080738 A1 | 4/2005 | Sellen et al. | |
| 2005/0086136 A1 | 4/2005 | Love et al. | |
| 2005/0097046 A1 | 5/2005 | Singfield | |
| 2005/0097050 A1 | 5/2005 | Orcutt | |
| 2005/0108167 A1 * | 5/2005 | Cordery et al. | 705/45 |
| 2005/0109833 A1 | 5/2005 | Page | |
| 2005/0129300 A1 | 6/2005 | Sandison et al. | |
| 2005/0139670 A1 | 6/2005 | McGlamery et al. | |
| 2005/0144131 A1 | 6/2005 | Aziz | |
| 2005/0171899 A1 | 8/2005 | Dunn et al. | |
| 2005/0175221 A1 | 8/2005 | Scott et al. | |
| 2005/0203857 A1 | 9/2005 | Friedman | |
| 2005/0211763 A1 | 9/2005 | Sgambati et al. | |
| 2005/0213805 A1 | 9/2005 | Blake et al. | |
| 2005/0220324 A1 | 10/2005 | Klein et al. | |
| 2005/0238252 A1 | 10/2005 | Prakash et al. | |
| 2005/0243378 A1 | 11/2005 | Klein et al. | |
| 2005/0243379 A1 | 11/2005 | Klein et al. | |
| 2005/0244035 A1 | 11/2005 | Klein et al. | |
| 2005/0252960 A1 | 11/2005 | Murata | |
| 2005/0256839 A1 | 11/2005 | Leong et al. | |
| 2005/0281448 A1 | 12/2005 | Lugg | |
| 2006/0006222 A1 | 1/2006 | Brey et al. | |
| 2006/0023930 A1 | 2/2006 | Patel et al. | |
| 2006/0045321 A1 | 3/2006 | Yu | |
| 2006/0045600 A1 | 3/2006 | Lugg | |
| 2006/0080245 A1 | 4/2006 | Bahl et al. | |
| 2006/0106717 A1 * | 5/2006 | Randle et al. | 705/45 |
| 2006/0112013 A1 | 5/2006 | Maloney | |
| 2006/0118613 A1 | 6/2006 | McMann et al. | |
| 2006/0133277 A1 | 6/2006 | Carozza et al. | |
| 2006/0167784 A1 | 7/2006 | Hoffberg | |
| 2006/0182331 A1 | 8/2006 | Gilson et al. | |
| 2006/0182332 A1 | 8/2006 | Weber | |
| 2006/0184441 A1 | 8/2006 | Haschka et al. | |
| 2006/0186194 A1 | 8/2006 | Richardson et al. | |
| 2006/0188310 A1 | 8/2006 | Sandison et al. | |
| 2006/0188311 A1 | 8/2006 | Lugg | |
| 2006/0191998 A1 | 8/2006 | Mueller et al. | |
| 2006/0206427 A1 | 9/2006 | Love et al. | |
| 2006/0212391 A1 | 9/2006 | Norman et al. | |
| 2006/0212449 A1 * | 9/2006 | Novy | 707/7 |
| 2006/0229987 A1 | 10/2006 | Leekley | |
| 2006/0237526 A1 | 10/2006 | Mueller et al. | |
| 2006/0248009 A1 | 11/2006 | Hicks et al. | |
| 2006/0265413 A1 * | 11/2006 | Blencowe | 707/102 |
| 2006/0280354 A1 | 12/2006 | Murray | |
| 2007/0095888 A1 | 5/2007 | Mueller et al. | |
| 2007/0100672 A1 | 5/2007 | McBrida et al. | |
| 2007/0156438 A1 | 7/2007 | Popadic et al. | |
| 2007/0235518 A1 | 10/2007 | Mueller et al. | |
| 2007/0244782 A1 | 10/2007 | Chimento | |
| 2007/0288382 A1 * | 12/2007 | Narayanan et al. | 705/45 |
| 2008/0006687 A1 | 1/2008 | Mueller et al. | |
| 2008/0040249 A1 * | 2/2008 | Re et al. | 705/35 |
| 2008/0097899 A1 | 4/2008 | Jackson et al. | |
| 2008/0103790 A1 | 5/2008 | Abernethy et al. | |
| 2008/0162319 A1 | 7/2008 | Breeden et al. | |
| 2008/0162320 A1 | 7/2008 | Mueller et al. | |
| 2008/0162321 A1 | 7/2008 | Breeden et al. | |
| 2008/0162322 A1 | 7/2008 | Breeden et al. | |
| 2008/0247629 A1 | 10/2008 | Gilder et al. | |
| 2010/0312705 A1 * | 12/2010 | Caruso et al. | 705/45 |

OTHER PUBLICATIONS

"Vision, Strategy & Approach to Image Quality & Archive Integrity, a Review of Carreker's Current Initiatives Towards Image Quality Detection & Resolution", Federal Reserve System, Aug. 19, 2003, Copyright © 2003 Carreker Corporation, pp. 1-43.

"Image Exchange Suite, Image Enabling Check Presentment", Federal Reserve System, Aug. 19, 2003, Copyright © 2003 Carreker Corporation, pp. 1-11.

"Image Inspector Questions", from presentation dated Jul. 2003, pp. 1-2.

"FRB Check 21 Project, Federal Reserve Financial Services, Carreker Requirements Response", Nov. 18, 2003, Copyright © 2002 Carreker Corporation, pp. 1-18.

(56) References Cited

OTHER PUBLICATIONS

"FRB Check 21 Project, Federal Reserve Financial Services, Additional Carreker Proposals", Nov. 18, 2003, Copyright © 2002 Carreker Corporation, pp. 1-30.

"SortLogic Systems Ushers in New Electronic Banking Era with Virtual Capture Solution for Check Image Exchange", Apr. 7, 2005, SortLogic Systems, a Division of Omni-Soft, Inc., pp. 1-2.

"BancTec Unveils Image Quality Assurance Suite", Feb. 16, 2004, BancTec, Inc., http://www.banctec.com/PressRelease.cfm?PRID=174, pp. 1-3.

"What is Check 21?", VSOFT Corporation, available at http://www.vsoftcorp.com/check21.htm.

"Check21 Cash Letter: Clear Check Images Rather than Paper Checks", Symitar, available at http://www.symitar.com/Default.aspx?P=2d1883d0-91be-496d-9047-64a83378dd36.

"Creating, Editing and Using Image Cash Letter, X9.37 Files", All My Papers, available at http://www.ggx.com/solutions_7.htm.

Holcomb, Notice 04-57, Aug. 27, 2004, Federal Reserve Bank of Dallas, 6 pages.

Greene, U.S. Appl. No. 11/482,379, Office Action, Sep. 30, 2009, 29 pages.

Greene, U.S. Appl. No. 11/482,379, Office Action, Jun. 10, 2009, 8 pages.

Greene, U.S. Appl. No. 11/482,379, Office Action, Sep. 29, 2008; 5 pages.

Labaze, U.S. Appl. No. 11/482,360, Office Action, Sep. 21, 2009, 8 pages.

Captovation Announces the Release of Check Capture 5.1: Newest Version of Check Imaging Software Includes Features to Facilitate Electronic Check Exchange and Presentment, Business Wire; New York, Aug. 10, 2006. p. 1, last accessed May 9, 2010, available online.

3.Next Stop: image exchange?, ABA Banking Journal (0194-5947), 2003. vol. 95, Issue 11, p. 10.

"All My Papers tm, Creating Editing and Using Image Cash Letter. X9.37 Files." http://replay.web.archive.org/20060519041745/http://www.ggx.comisolutions_7.htm> retrieved Apr. 26, 2011 (6 pages).

* cited by examiner

PRIORITIZING CHECKS FOR ELECTRONIC CHECK PROCESSING

RELATED PATENT APPLICATION

This patent application claims priority under 35 U.S.C. §119 to U.S. Provisional Patent Application No. 60/857,666, entitled "Check Processing Using Substitute Check Images," filed Nov. 7, 2006, the complete disclosure of which is hereby fully incorporated herein by reference. This patent application also is related to co-pending U.S. patent application Ser. No. 11/983,034, entitled "Automated Return Item Re-Clear," filed Nov. 6, 2007, U.S. patent application Ser. No. 11/982,985, entitled "Systems and Methods for Preventing Duplicative Check Processing," filed Nov. 6, 2007, U.S. patent application Ser. No. 11/983,032, entitled "System and Method for Processing Duplicative Electronic Check Return Files," filed Nov. 6, 2007, and U.S. patent application Ser. No. 11/982,923, entitled "System and Method for Processing Duplicative Electronic Check Reversal Files," filed Nov. 6, 2007. The complete disclosure of all of the foregoing related applications is hereby fully incorporated herein by reference.

TECHNICAL FIELD

The invention relates generally to prioritizing checks for electronic check processing and more particularly to prioritizing checks for electronic check processing to meet processing deadlines.

BACKGROUND

Effective Oct. 28, 2004, the Check Clearing for the 21st Century Act ("the Act") improved the ability of banks to use electronic images of paper checks by, for example, submitting those images, along with associated information, for electronic processing. Under the Act, if a receiving financial institution ("RI") or its customer requires a paper check, a paper image replacement document ("IRD"), such as a paper "substitute check," can be created from an electronic check image and associated electronic information. Such a substitute check meeting specified requirements is the legal equivalent of an original paper check, and an RI is required to accept the substitute check for payment. This process enables banks to reduce the costs and inconveniences associated with physically handling and transporting original paper checks.

Under the Act, the substitute check must be essentially an exact copy of the original paper check to be the legal equivalent of the original paper check. In particular, the substitute check must include an exact copy of all of the Magnetic Ink Character Recognition ("MICR") data provided on the original paper check and all check endorsements.

The terms "check," "substitute check," and "IRD" generally are used interchangeably herein to refer to any electronic or paper document that can be used for electronic payment processing purposes, whether or not the document is the legal equivalent of a paper check negotiable instrument. The terms "bank," "customer," "RI," and "processing entity" generally are used herein to refer to any party performing conventional or electronic check processing at any stage, including depositing and receiving institutions, their non-bank subsidiaries and affiliates, and any non-bank third party agents that provide processing services to banks.

Typically, a processing entity receives an electronic check for processing in an electronic image cash letter file (hereinafter an "ICL file"), which includes one or more electronic image cash letters ("ICLs"). Each ICL includes one or more electronic bundles of checks to be processed. Each bundle includes data for one or more checks. For a particular check, the ICL can include one or more electronic images of the check, the complete MICR data provided on the check, and additional financial data related to the check, such as endorsement information (hereinafter "addenda data").

The ICL can further include a series of records related to the checks. For example, for each bundle of checks in the ICL, the ICL can include a bundle summary control record comprising information about the bundle, such as a bundle identification number, the number of checks in the bundle, the value of each of the checks in the bundle, and the total value of all the checks in the bundle. The ICL also can include an ICL control record comprising information about the origin and destination of the ICL, and a cash letter bundle summary control record comprising a summary of all the bundle summary control records in the ICL. The processing entity can process the ICL for payment and presentment. For example, the processing entity can present the checks in the ICL electronically or via printed paper IRDs.

Alternatively, the processing entity can receive a paper cash letter with one or more paper checks for processing. As with the ICLs, the processing entity can process information in the paper checks for payment and presentment. Certain exemplary methods for performing payment and presentment processing for electronic and paper checks are described in co-pending U.S. patent application Ser. No. 11/362,344, entitled "Cash Letter Print Streams With Audit Data" and U.S. patent application Ser. No. 11/362,343, entitled "Expanded Mass Data Sets for Electronic Check Processing," the complete disclosures of which are hereby fully incorporated herein by reference.

Traditionally, processing entities process checks on a first in, first out basis. Thus, later-submitted, high value checks destined for presentment to preferred banks will be processed after earlier-submitted, low value checks destined for presentment to non-preferred banks. If processing volumes become heavier than expected or if certain system processes fail, then at least some of the later-submitted, high value checks may not be processed on time. Similarly, later-submitted checks requiring earlier output times than other, earlier-submitted checks may not be processed on time. For example, checks that will be presented as paper substitute checks generally require earlier output times than checks that will be presented electronically, because it takes longer to print and ship paper substitute checks than it does to transmit electronic data.

Therefore, a need exists in the art for a system and method for prioritizing checks for electronic check processing. In particular, a need exists in the art for a system and method for prioritizing checks for electronic check processing based on check characteristics, such as check values, receiving institutions associated with the checks, and/or delivery methods associated with the checks.

SUMMARY

The invention provides systems and methods for prioritizing checks for electronic check processing. In particular, the invention provides systems and methods for prioritizing checks for electronic check processing based on check characteristics, such as check values, receiving institutions associated with the checks, and/or delivery methods associated with the checks.

A check processing entity includes a check processing system. According to certain exemplary aspects, a prioritization module of the check processing system can receive information regarding multiple checks in a check processing queue of the check processing system. For example, a check processing module of the check processing system can transmit the information to the prioritization module based on information from one or more paper cash letters or electronic ICL files transmitted to the processing entity by a sending customer.

The prioritization module can assign at least one priority indicator to one or more of the checks. Each priority indicator includes information regarding a characteristic of its associated check, such as a value of the check, a receiving institution associated with the check, and/or a delivery method associated with the check. According to certain exemplary aspects, each characteristic can relate to a processing priority of the check. For example, a high value check may have a higher processing priority than a low value check.

The check processing module processes the checks on a first in, first out ("FIFO") basis. Thus, at least initially, the check processing module processes the checks without regard to any priority indicators assigned to each check. During processing, the prioritization module monitors processing deadlines of the checks. For example, the prioritization module can compare a processing deadline of each check with an expected processing completion time of the check to determine whether each check will be processed on time.

If the prioritization module determines that any of the checks cannot be processed on time, then the prioritization module can prioritize the checks for processing based on the assigned priority indicators. The prioritization module can select at least one of the priority indicators. For example, the prioritization module can select one or more priority indicators associated with a particular check value, receiving institution, and/or delivery method. According to certain exemplary aspects, the prioritization module can make this selection automatically or based on instructions from an operator of the processing entity. For example, the prioritization module can output information requesting the operator to select the priority indicator(s).

The prioritization module can identify all checks associated with the selected priority indicator(s). The prioritization module can re-order the checks so that the identified checks are placed at the front of the check processing queue. The identified checks may be sorted based on information within the priority indicators or based on other suitable means, such as relative check values. For example, the identified checks may be sorted on a FIFO basis. Thus, the prioritization module re-orders the checks so that higher priority checks are processed before lower priority checks.

These and other aspects, objects, features, and advantages of the invention will become apparent to a person skilled in the art upon consideration of the following detailed description of illustrated exemplary embodiments, which include the best mode of carrying out the invention as presently perceived.

DETAILED DESCRIPTION OF EXEMPLARY EMBODIMENTS

The invention is directed to prioritizing checks for electronic check processing. In particular, the invention is directed to prioritizing checks for electronic check processing based on check characteristics, such as check values, receiving institutions associated with the checks, and/or delivery methods associated with the checks. Thus, the invention allows higher priority checks to be processed more expeditiously for payment and presentment.

The invention includes a computer program that embodies the functions described herein and illustrated in the appended flow charts. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Turning now to the drawings, in which like numerals indicate like elements throughout the figures, exemplary embodiments of the invention are described in detail.

Figure 1:
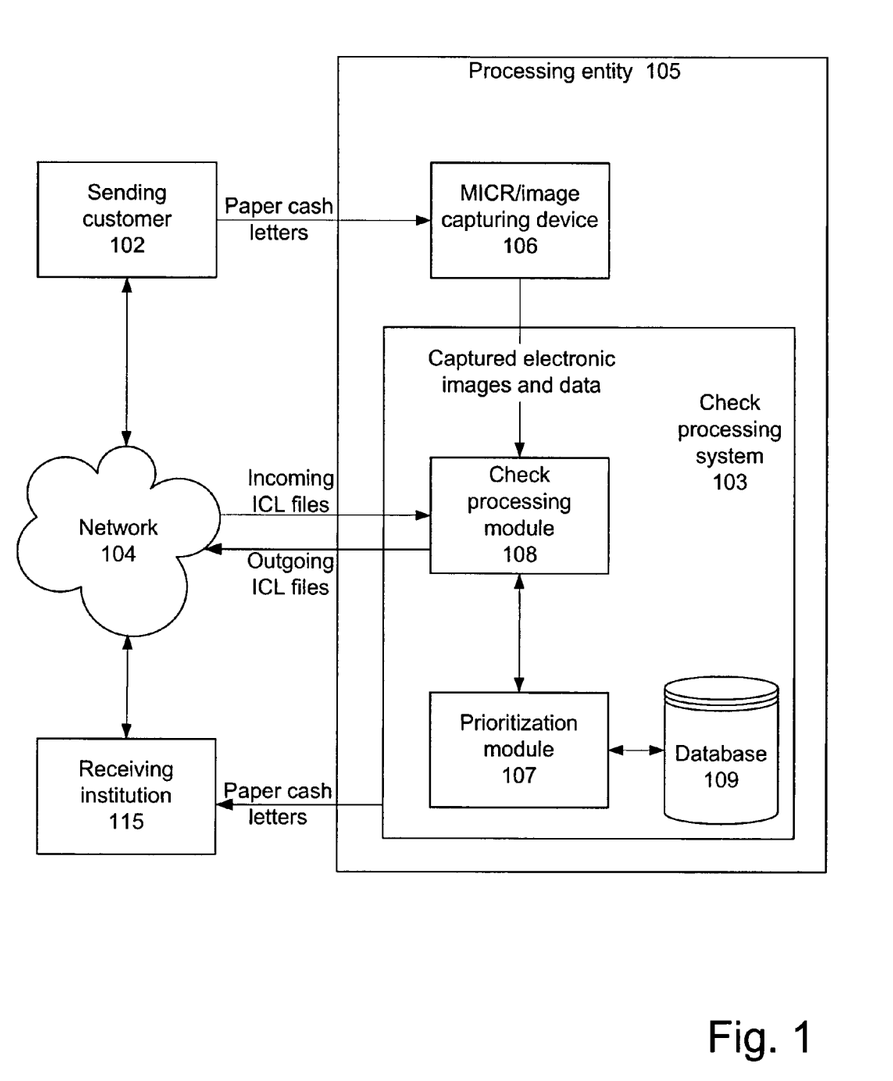
FIG. 1 is a block diagram depicting a system for prioritizing checks for electronic check processing, in accordance with certain exemplary embodiments of the invention.

FIG. 1 is a block diagram depicting a system 100 for prioritizing checks for electronic check processing, in accordance with certain exemplary embodiments of the invention. The system 100 is described hereinafter with reference to the methods illustrated in FIGS. 2-4.

Figure 2:
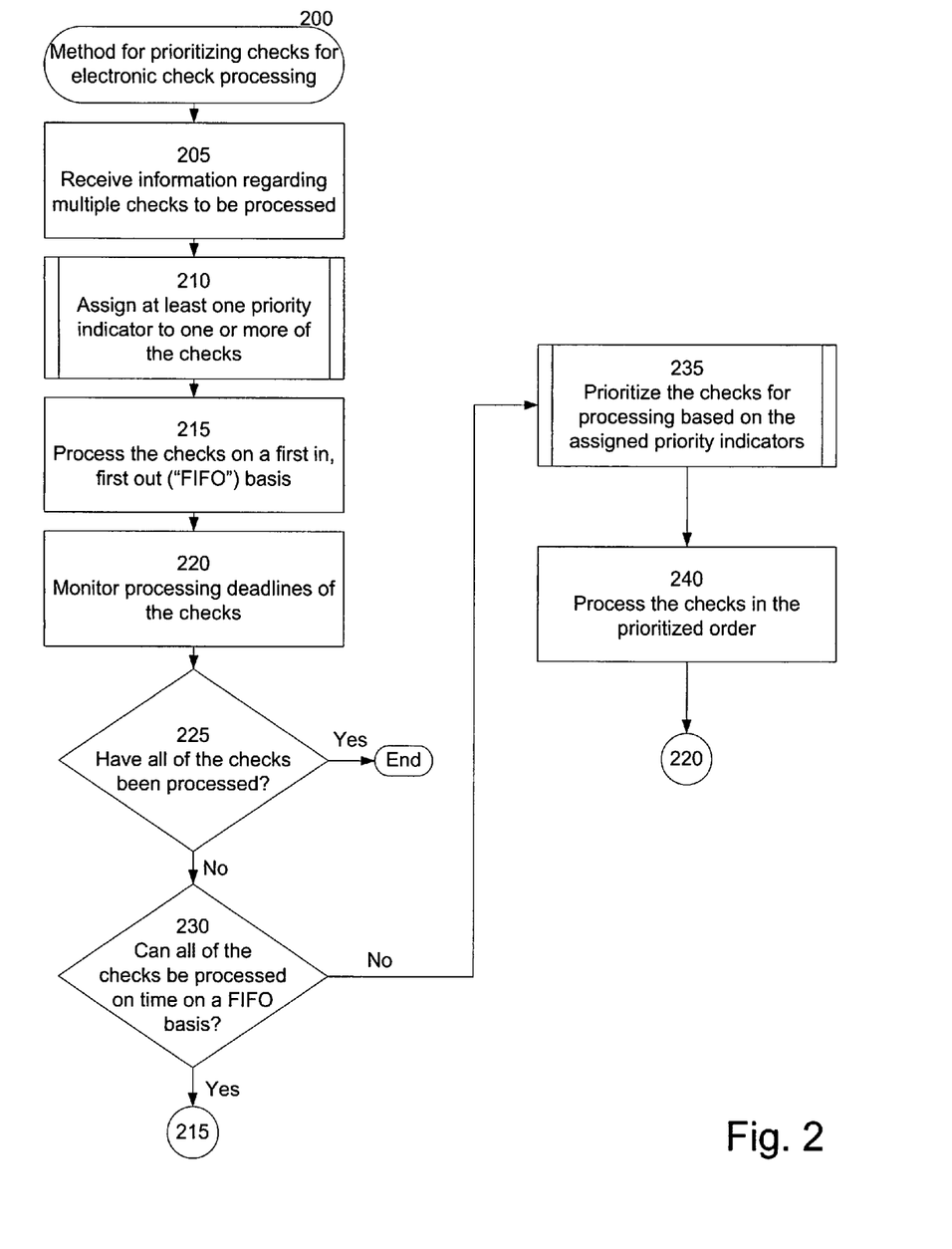
FIG. 2 is a flow chart depicting a method for prioritizing checks for electronic check processing, in accordance with certain exemplary embodiments of the invention.

FIG. 2 is a flow chart depicting a method 200 for prioritizing checks for electronic check processing, in accordance with certain exemplary embodiments of the invention. The exemplary method 200 is illustrative and, in alternative embodiments of the invention, certain steps can be performed in a different order, in parallel with one another, or omitted entirely, and/or certain additional steps can be performed without departing from the scope and spirit of the invention. The method 200 is described hereinafter with reference to FIGS. 1 and 2.

A check processing entity 105 includes a check processing system 103. In step 205, a prioritization module 107 of the check processing system 103 receives information from a check processing module 108 of the check processing system 103 regarding multiple checks to be processed. For example, the check processing module 108 can transmit the check information based on information from one or more paper cash letters or ICL files transmitted to the processing entity 105 by a sending customer 102.

Each ICL file is an electronic file that includes at least one ICL. For example, each ICL can be an electronic file that complies with the ANSI X9.37/X9.100 standard, or other appropriate industry standards, as may change from time to time. Each ICL includes one or more bundles of checks to be processed. For a particular check, the ICL can include one or more electronic images of the check, the complete MICR data provided on the check, and addenda data of the check.

The ICL also can include a series of records related to the checks. For example, for each bundle of checks in the ICL, the ICL can include a bundle summary control record including information about the bundle, such as a bundle identification number, the number of checks in the bundle, the value of each of the checks in the bundle, and the total value of all the checks in the bundle. The ICL also can include an ICL control record containing information about the origin and destination of the ICL, and a cash letter bundle summary control record containing a summary of all the bundle summary control records in the ICL.

In certain exemplary embodiments, the ICL file also can include a file header including information identifying the sending customer 102, such as a name of the sending customer 102 and/or a bank routing number of the sending customer 102. The file header also can include information regarding a creation date of the ICL file and information regarding whether each item in the ICL file is associated with a forward transaction or a return transaction.

As illustrated in FIG. 2, the sending customer 102 can submit the ICL file to the processing entity 105 via a network 104. The network 104 can include any wired or wireless telecommunication means by which computerized devices can exchange data, including for example, a local area network (LAN), a wide area network (WAN), an intranet, an Internet, or any combination thereof. In certain exemplary embodiments, the processing entity 105 can include a Federal Reserve Bank or other check processor that receives transaction items from a depositing institution 102, distributes the items to appropriate receiving institutions 115 or their third party processor(s), and performs settlement functions (crediting and debiting of accounts) for the affected financial institutions.

Each paper cash letter includes one or more paper checks. For example, the sending customer 102 can send a paper cash letter to the processing entity via hand or mail delivery. Upon receipt of the paper cash letter at the processing entity 105, a MICR/image capturing device 106 of the processing entity 105 can electronically capture MICR data from each check and images of the front and/or back sides of each check. The MICR/image capturing device 106 can include a separate or integrated MICR reader and image capturing device. The MICR/image capturing device 106 can forward the captured electronic data and images to the check processing module 108 for processing.

In step 210, the prioritization module 107 assigns at least one priority indicator to one or more of the checks. Each priority indicator includes information regarding a characteristic of its associated check. According to certain exemplary embodiments, representative check characteristics include a value of the check, a receiving institution associated with the check, a delivery method associated with the check, and/or any other suitable characteristic for prioritizing the processing of the check. In certain exemplary embodiments, each characteristic can relate to a processing priority of the check. For example, a higher value check may have a higher processing priority than a lower value check, a preferred receiving institution 115 may have a higher processing priority than a non-preferred receiving institution, and a check to be printed for delivery may have a higher processing priority than a check to be delivered electronically.

A "preferred" receiving institution 115 is a receiving institution 115 for which special, preferential treatment may be desired during check processing. For example, a preferred receiving institution 115 can be a receiving institution 115 that processes large volumes of high value checks. A preferred receiving institution 115 also can be a receiving institution 115 that requires checks to be presented as paper, substitute checks. A person of ordinary skill in the art having the benefit of the present disclosure will recognize that many other reasons may exist for a receiving institution 115 to be "preferred."

In certain exemplary embodiments, the prioritization module 107 can store information regarding the priority indicator(s) assigned to a particular check in a database 109 of the check processing system 103. For example, the prioritization module 107 can store information regarding the priority indicator(s) assigned to a particular check in an electronic file or record associated with the check. In addition or alternatively, the prioritization module 107 can store an electronic file or record with a list, table, or other suitable data organization method of all of the checks and the corresponding priority indicators associated therewith. For example, the prioritization module 107 can store such electronic file(s) or record(s) in the database 109 of the check processing system 103.

Step 210 is discussed in more detail hereinafter with reference to FIG. 3.

In step 215, the check processing module 108 processes the checks for payment and presentment based on a first in, first out ("FIFO") basis. Thus, at least initially, the check processing module 108 processes the checks without regard to any priority indicators assigned to each check. Instead, the check processing module 108 processes the checks in the order that they are received (including the order in which the checks are provided in a paper cash letter or an ICL).

In step 220, the prioritization module 107 monitors processing deadlines of the checks. For example, the prioritization module 107 can compare a processing deadline of each check with an expected processing completion time of the check to determine whether each check will be processed on time. By way of example only, a processing deadline of a check to be presented as a paper substitute check can be a time by which the check must be printed for mailing to a receiving institution 115. Similarly, a processing deadline of a check to be presented electronically can be a time by which the check must be prepared for electronic transmission to the receiving institution 115. In certain exemplary embodiments, the prioritization module 107 can identify the processing deadlines and expected processing completion times for the checks based on information received from the check processing module 108. In certain exemplary embodiments, the prioritization module 107 can determine an expected processing completion time of a check based on the number of checks to be processed before the particular check and the average processing time for each check.

In step 225, the prioritization module 107 determines whether all of the checks have been processed. If so, then the method 200 ends. As all of the checks already have been processed, further examination or prioritization of the checks is unnecessary. If the prioritization module 107 determines in step 225 that any of the checks have not yet been processed, then the method 200 branches to step 230.

In step 230, the prioritization module 107 determines whether all of the (unprocessed) checks can be processed on time if they are processed on a FIFO basis. In an exemplary embodiment, the prioritization module 107 can determine whether the checks can be processed on time based on the expected processing completion time of each check in view of the corresponding processing deadline for each check. If all of the checks can be processed on time, then the method 200 branches to step 215, discussed previously. Thus, the checks will continue to be processed on a FIFO basis for as long as that basis will result in timely processing completion.

If the prioritization module 107 determines in step 230 that any of the checks cannot be processed on time if the checks are processed on a FIFO basis, then the method 200 branches to step 235. In step 235, the prioritization module 107 prioritizes the checks for processing based on the priority indicators assigned in step 210. Thus, the prioritization module 107 re-orders the checks so that higher priority checks are processed before lower priority checks.

In certain exemplary embodiments, in step 235, the prioritization module 107 can output an alert notifying an operator (not shown) of the processing entity 105 that one or more of the checks cannot be processed on time if the checks are processed on a FIFO basis. For example, the alert can include information regarding the check(s) that cannot be processed on time, such as a dollar value, receiving institution 115, and/or delivery method associated with each check. The alert also can include information regarding a total number and/or total value of the check(s) that cannot be processed on time on a FIFO basis.

In certain exemplary embodiments, the operator can select a prioritization scheme to apply in prioritizing the checks in step 235. For example, the operator can determine to prioritize all checks destined for a particular receiving institution 115. The operator also can determine to further prioritize those checks based on another check characteristic, such as respective dollar values of the checks. The operator can identify the checks having the selected priority characteristics based on the priority indicators assigned in step 210. Step 235 is described in more detail hereinafter with reference to FIG. 4.

From step 235, the method 200 proceeds to step 240. In step 240, the check processing module 108 processes the checks in the prioritized order.

The method 200 then branches to step 220 to repeat the monitoring of the check's processing deadlines. Such continuous monitoring allows real time re-prioritization of the checks based on current needs. For example, repeating step 230 and step 215, if applicable, allows re-ordering of the checks on a FIFO basis, if a FIFO basis would allow timely processing of all the checks. Thus, if processing volumes or system resources change such that prioritization is no longer necessary, the prioritization module 107 can cancel the prioritization and revert back to a FIFO processing order. Similarly, if processing or system resources change such that FIFO processing is no longer timely, the prioritization module 107 can re-order the checks based on prioritization in step 235.

Figure 3:
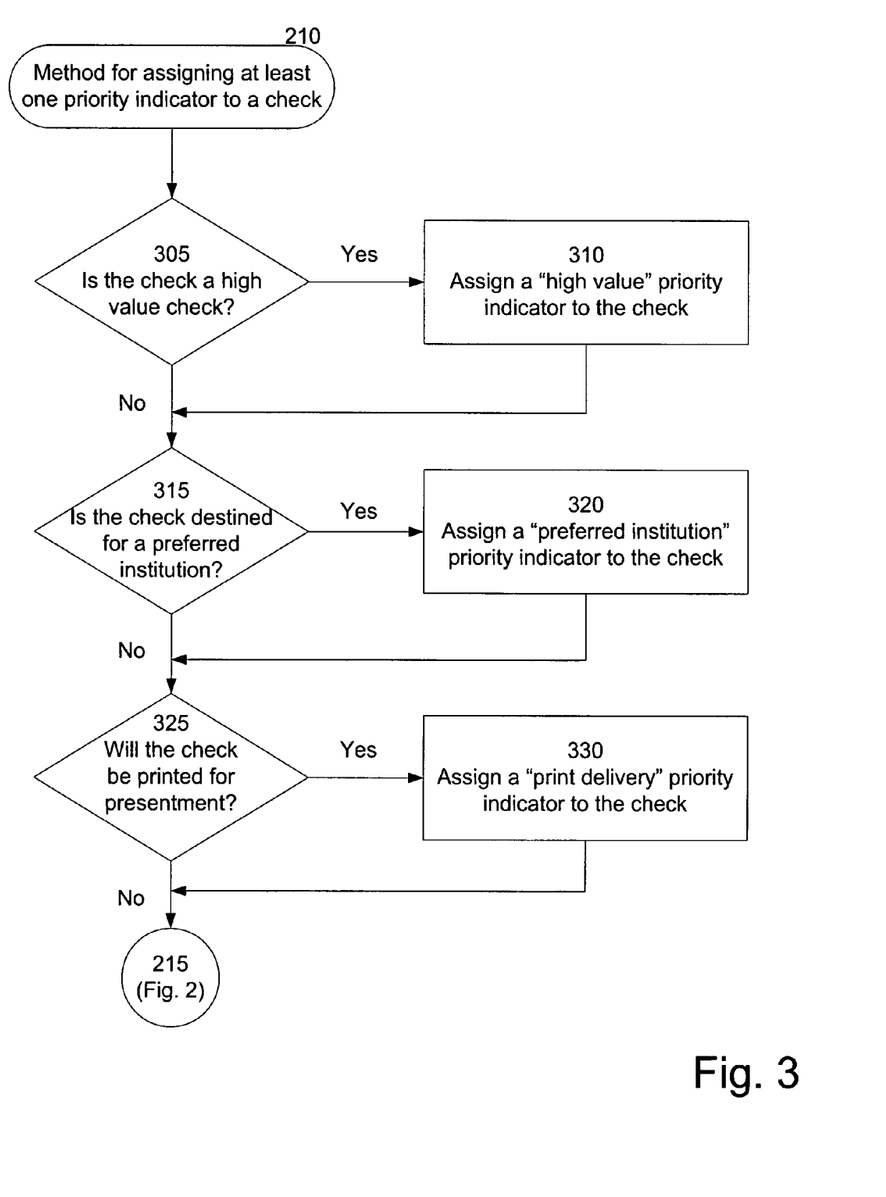
FIG. 3 is a flow chart depicting a method for assigning at least one priority indicator to a check, in accordance with certain exemplary embodiments of the invention.

FIG. 3 is a flow chart depicting a method 210 for assigning at least one priority indicator to a check, in accordance with certain exemplary embodiments of the invention, as referenced in step 210 of the method 200 of FIG. 2. The exemplary method 210 is illustrative and, in alternative embodiments of the invention, certain steps can be performed in a different order, in parallel with one another, or omitted entirely, and/or certain additional steps can be performed without departing from the scope and spirit of the invention. The method 210 is described hereinafter with reference to FIGS. 1-3.

The method 210 can be performed for each of the checks identified in step 205 of the method 200 of FIG. 2. In step 305, the prioritization module 107 determines whether the check is a high value check. In certain exemplary embodiments, the prioritization module 107 can make this determination by comparing a dollar value of the check to a predetermined high value threshold. For example, the prioritization module 107 can determine that the check is a high value check if it has a dollar value of more than $5,000. The predetermined high value threshold can be configured by an operator of the check processing system 103. In certain exemplary embodiments, the prioritization module 107 can access an electronic file or record with the high value threshold. For example, the electronic file or record can be stored in the database 109 of the check processing system 103.

If the prioritization module 107 determines in step 305 that the check is not a high value check, then the method 210 branches to step 315, which is discussed hereinafter. If the prioritization module 107 determines in step 305 that the check is a high value check, then the method 210 branches to step 310. In step 310, the prioritization module 107 assigns a "high value" priority indicator to the check. The high value priority indicator includes information regarding the high value of the check, such as the dollar value of the check and/or an indicator indicating that the check has a high value based on the predetermined high value threshold. The high value priority indicator can include any combination of numbers, letters, symbols, and/or other characters. For example, the high value priority indicator can simply be the symbol "$."

In certain exemplary embodiments, the prioritization module 107 can store information regarding the assigned high value indicator in an electronic file or record in, or otherwise associated with, the check. For example, the electronic file or record can be stored in the database 109 of the check processing system 103.

From step 310, the method 210 proceeds to step 315.

In step 315, the prioritization module 107 determines whether the check is destined for presentment to a preferred receiving institution 115. In certain exemplary embodiments, the prioritization module 107 can make this determination by comparing an identification of the receiving institution 115 associated with the check with a list of one or more preferred receiving institutions 115. For example, the list can be stored in the database 109 of the check processing system 103.

A "preferred" receiving institution 115 is a receiving institution 115 for which special, preferential treatment may be desired during check processing. For example, a preferred receiving institution 115 can be a receiving institution 115 that processes large volumes of high value checks. A preferred receiving institution 115 also can be a receiving institution 115 that requires checks to be presented as paper, substitute checks. A person of ordinary skill in the art having the benefit of the present disclosure will recognize that many other reasons may exist for a receiving institution 115 to be "preferred." The list of preferred receiving institutions 115 can be configurable by an operator of the check processing system 103.

If the prioritization module 107 determines in step 315 that the check is not destined for presentment to a preferred receiving institution 115, then the method 210 branches to step 325, which is discussed hereinafter. If the prioritization module 107 determines in step 315 that the check is destined for presentment to a preferred receiving institution 115, then the method 210 branches to step 320.

In step 320, the prioritization module 107 assigns a "preferred institution" priority indicator to the check. The preferred institution priority indicator includes information regarding the preferred receiving institution 115 associated with the check, such as a name, address, routing/transit number, and/or American Bankers Association ("ABA") number of the preferred receiving institution 115, and/or an indicator indicating that the check is associated with a preferred receiving institution 115. The preferred institution priority indicator can include any combination of numbers, letters, symbols, and/or other characters.

In certain exemplary embodiments, the prioritization module 107 can store information regarding the assigned preferred institution priority indicator in an electronic file or record in, or otherwise associated with, the check. For example, the electronic file or record can be stored in the database 109 of the check processing system 103.

From step 320, the method 210 proceeds to step 325.

In step 325, the prioritization module 107 determines whether information regarding the check will be printed for presentment. For example, the information regarding the check can be printed as a substitute check to be presented to the receiving institution 115. In certain exemplary embodiments, the prioritization module 107 can make this determination by reading information in the check or one or more electronic records or files associated therewith and/or by comparing an identification of the receiving institution 115 associated with the check with a list of receiving institutions 115 requiring paper substitute checks for presentment.

If the prioritization module 107 determines in step 325 that information regarding the check will not be printed for presentment, then the method 210 branches to step 215 of the method 200 of FIG. 2, discussed previously. If the prioritization module 107 determines in step 325 that information regarding the check will be printed for presentment, then the method 210 branches to step 330.

In step 330, the prioritization module 107 assigns a "print delivery" priority indicator to the check. The print delivery priority indicator includes information regarding the printing of the information regarding the check, such as time by which printing must be completed and/or an indicator indicating that the information regarding the check will be printed for presentment. The print delivery priority indicator can include any combination of numbers, letters, symbols, and/or other characters.

In certain exemplary embodiments, the prioritization module 107 can store information regarding the assigned print delivery indicator in an electronic file or record in, or otherwise associated with, the check. For example, the electronic file or record can be stored in the database 109 of the check processing system 103. From step 330, the method 210 branches to step 215 of the method 200 of FIG. 2.

A person of ordinary skill in the art having the benefit of the present disclosure will recognize that the above-identified priority indicators are merely exemplary in nature. In certain alternative exemplary embodiments, other suitable priority indicators may be used.

Figure 4:
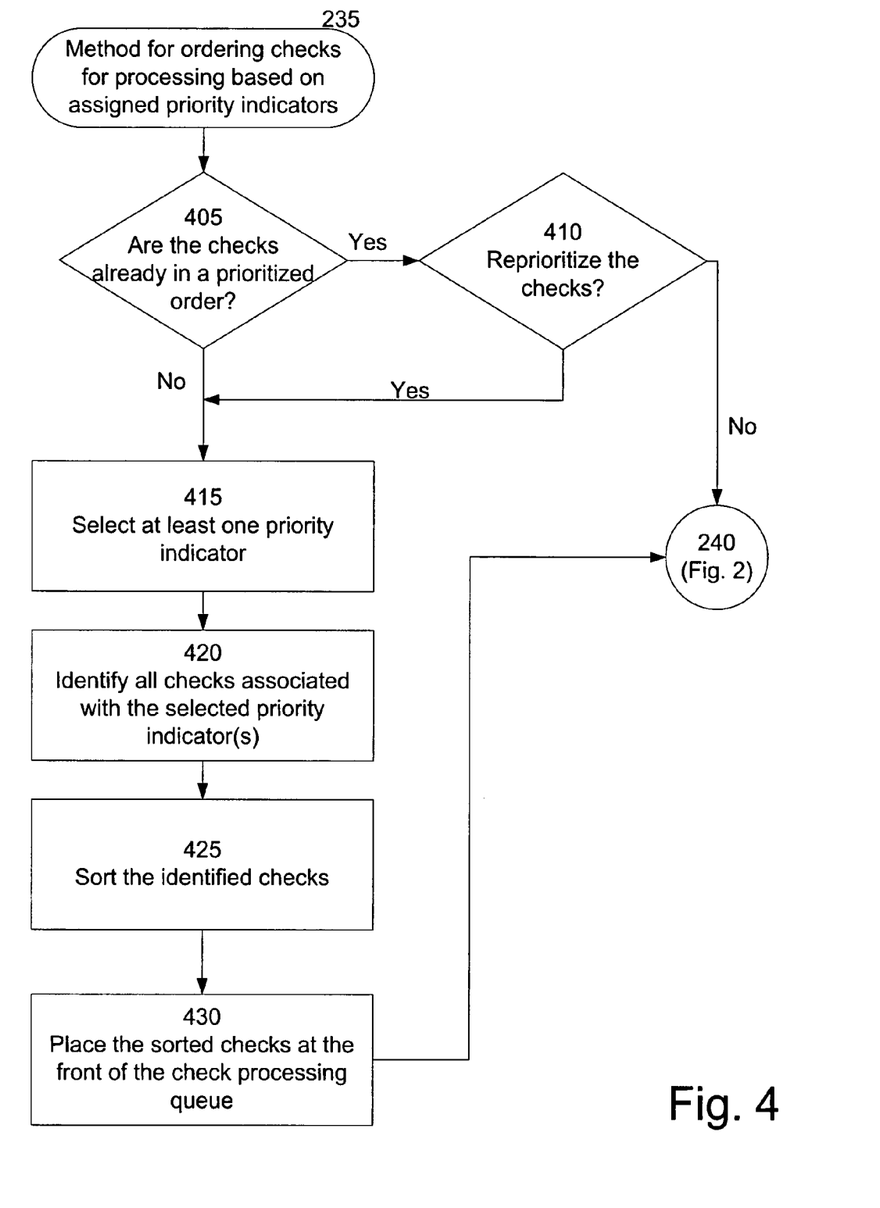
FIG. 4 is a flow chart depicting a method for ordering checks for electronic check processing based on assigned priority indicators, in accordance with certain exemplary embodiments of the invention.

FIG. 4 is a flow chart depicting a method 235 for ordering checks for processing based on assigned priority indicators, in accordance with certain exemplary embodiments of the invention, as referenced in step 235 of the method 200 of FIG. 2. The exemplary method 235 is illustrative and, in alternative embodiments of the invention, certain steps can be performed in a different order, in parallel with one another, or omitted entirely, and/or certain additional steps can be performed without departing from the scope and spirit of the invention. The method 210 is described hereinafter with reference to FIGS. 1-4.

In step 405, the prioritization module 107 determines whether the checks already are in a prioritized order. In other words, the prioritization module 107 determines whether it already has previously ordered the checks in a non-FIFO order. For example, the prioritization module 107 can consult and/or maintain an electronic file or record of prioritization activity to make this determination. In certain exemplary embodiments, the prioritization module 107 can store the electronic file or record in the database 109 of the check processing system 103.

If the prioritization module 107 determines in step 405 that the checks already are in a prioritized order, then the method 235 branches to step 410. In step 410, the prioritization module 107 determines whether to reprioritize the checks. In other words, the prioritization module 107 determines in step 410 whether to re-order the checks based on a different prioritization scheme or to include checks that began processing after the previous prioritizing of the checks.

In certain exemplary embodiments, this determination can be generated automatically based on certain processing conditions at the processing entity 105. For example, if the front of a check processing queue currently includes checks to be printed for presentment and all printers (not shown) at the processing entity 105 are offline, the prioritization module 107 can automatically determine in step 405 to reprioritize the checks so that checks that do not have to be printed for presentment will be processed sooner.

Alternatively, the determination in step 405 can be made based on instructions from an operator at the processing entity 105. For example, in step 405, the prioritization module 107 can output an alert requesting the operator to provide instructions regarding reprioritization. The prioritization module 107 can act in accordance with the operator's instructions.

If the prioritization module 107 determines in step 410 not to reprioritize the checks, then the method 235 branches to step 240 of the method 200 of FIG. 2, discussed previously. If the prioritization module 107 determines in step 410 to reprioritize the checks, then the method 235 branches to step 415 discussed hereinafter.

Referring back to step 405, if the prioritization module 107 determines that the checks are not already in a prioritized order, then the method 235 branches directly to step 415.

In step 415, the prioritization module 107 selects at least one priority indicator. In certain exemplary embodiments, the prioritization module 107 can select one or more of the priority indicators assigned in step 210 of method 200 of FIG. 2. For example, the prioritization module 107 can select a priority indicator associated with a particular preferred receiving institution 115, a particular check value, a particular check delivery method, and/or another suitable check characteristic. In certain exemplary embodiments, the prioritization module 107 can perform step 415 automatically based on configured parameters or based on instructions received from an operator of the processing entity 105.

In step 420, the prioritization module 107 identifies all checks associated with the selected priority indicator(s). For example, if, in step 415, the prioritization module 107 selected a high value priority indicator, the prioritization module 107 can identify all checks associated with that high value priority indicator in step 420. In certain exemplary embodiments, the prioritization module 107 can select multiple priority indicators as alternatives or as paired requirements. For example, if, in step 415, the prioritization module 107 selected a high value priority indicator OR a print delivery indicator, then the prioritization module 107 can identify all checks associated with either the high value priority indicator or the print delivery indicator in step 420. Similarly, if in step 415, the prioritization module 107 selected a preferred institution priority indicator AND a high value priority indicator, then the prioritization module 107 can identify all checks associated with both the preferred institution priority indicator and the high value priority indicator in step 420.

In step 425, the prioritization module 107 sorts the identified checks based on the selected priority indicator(s) or other suitable factors. For example, if, in step 420, the prioritization module 107 identified all checks with a high value priority indicator, the prioritization module 107 can sort the identified checks based on their relative dollar values. Alternatively, the prioritization module 107 can sort the checks on a FIFO or other suitable basis. Where two or more priority indicators are selected in step 415, the checks can sequentially be sorted based on each priority indicator and/or in combination with a FIFO order. For example, if, in step 415, the prioritization module 107 selects a preferred institution priority indicator, a print delivery priority indicator, and a high value priority indicator, the prioritization module 107 can sort the identified checks by receiving institution 115, then by print time, and then by dollar value. A person of ordinary skill in the art having the benefit of this disclosure will recognize that multiple different combinations of priority indicators and sort patterns may be used.

In certain exemplary embodiments, the prioritization module 107 can perform step 425 automatically or based on instructions received from an operator of the processing entity 105. For example, the operator can specify the basis for sorting the identified checks. The basis may or may not be based on the priority indicator(s) selected in step 415.

In step 430, the prioritization module 107 places the sorted checks at the front of the check processing queue for processing by the check processing module 108. Thus, the check processing module 108 will process the prioritized checks, in the sorted order, before other checks not sorted or identified in steps 420-425. The method 235 then proceeds to step 240 of the method 200 of FIG. 2, discussed previously.

The invention can be used with computer hardware and software that performs the methods and processing functions described above. As will be appreciated by a person skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. It should be appreciated, therefore, that many aspects of the invention were described above by way of example only and are not intended as required or essential elements of the invention unless explicitly stated otherwise. Various modifications of, and equivalent steps corresponding to, the disclosed aspects of the exemplary embodiments, in addition to those described above, can be made by a person skilled in the art without departing from the spirit and scope of the present invention defined in the following claims, the scope of which is to be accorded the broadest interpretation so as to encompass such modifications and equivalent structures.

I claim:

1. A computer-implemented method for prioritizing checks for electronic check processing, comprising the steps of:
   receiving, by a computer, information regarding a plurality of checks;
   assigning, by the computer, priority indicators to at least a portion of the plurality of the checks;
   monitoring and determining, by the computer, whether all of the plurality of checks will be processed on time; and
   in response to determining that not all of the plurality of checks will be processed on time,
      selecting, by the computer, a combination of the priority indicators;
      identifying, by the computer, checks associated with the combination of priority indicators; and
      ordering, by the computer, the identified checks among the plurality of checks based on a sort according to a particular sequence of respective priority indicators of the combination of priority indicators.

2. The method of claim 1, wherein
   the step of monitoring and determining comprises determining, by the computer, whether each of the plurality of checks can be processed on time based on respective expected processing completion times of each of the plurality of checks, an average processing time of each of the plurality of checks, and respective processing deadlines of each of the plurality of checks,
   each priority indicator comprises information regarding a characteristic of a respective check to which the priority indicator is assigned, the characteristic comprising at least one of a value of the respective check, a receiving institution associated with the respective check, and a delivery method associated with the respective check.

3. The method of claim 1, wherein the step of ordering the identified checks among the plurality of checks further comprises ordering, by the computer, the plurality of checks other than the identified checks according to a first in, first out, order.

4. The method of claim 1, wherein the step of selecting a combination of the priority indicators comprises receiving, by the computer, an input to select the combination of priority indicators.

5. The method of claim 1, further comprising the steps of:
   determining, by the computer, an average processing time for each of the plurality of checks;
   determining, by the computer, expected processing completion times of each of the plurality of checks based on the average processing time for each of the plurality of checks; and
   determining, by the computer, that at least one of the plurality of checks cannot be processed on time if the checks are processed on a first in, first out, basis based on the estimated processing completion time and a processing deadline of the at least one of the plurality of checks, wherein
   the step of ordering the identified checks is performed in response to a determination that the at least one of the plurality of checks cannot be processed on time if the checks are processed on a first in, first out, basis.

6. The method of claim 5, further comprising the step of outputting, by the computer, information notifying that at least one of the plurality of checks cannot be processed on time in response to the determination that the at least one of the plurality of checks cannot be processed on time if the checks are processed on a first in, first out, basis.

7. A computer-implemented method for prioritizing checks for electronic check processing, comprising the steps of:
   receiving, by a computer, information regarding a plurality of checks;
   assigning, by the computer, priority indicators to each of the checks;
   monitoring, by the computer, processing deadlines of the plurality of checks in association with expected processing completion times of the plurality of checks;
   determining, by the computer, whether all of the checks can be processed on time if the checks are processed in a first order according to the monitored processing deadlines; and
   in response to determining that not all of the checks will be processed on time, selecting, by the computer, a combination of the priority indicators; and ordering, by the computer, the checks in a second order based on a sort according to a particular sequence of respective priority indicators of the combination of priority indicators.

8. The method of claim 7, wherein each of the priority indicators comprises information regarding a characteristic of a corresponding one of the checks to which the respective one of the priority indicators is assigned, the characteristic comprising at least one of a value of the corresponding check, a receiving institution associated with the corresponding check, and a delivery method associated with the corresponding check.

9. The method of claim 7, wherein the step of ordering the checks further comprises ordering, by the computer, the checks according to the particular sequence of respective priority indicators and a first in, first out, order.

10. The method of claim 9, wherein the step of ordering the checks for processing further comprises the step of identifying, by the computer, checks associated with the combination of priority indicators.

11. The method of claim 7, wherein the step of selecting a combination of the priority indicators comprises receiving, by the computer, an input to select the combination of the priority indicators.

12. The method of claim 7, further comprising the steps of:
determining, by the computer, an average processing time for each of the checks;
determining, by the computer, expected processing completion times of each of the checks based on the average processing time for each of the checks;
determining, by the computer, that at least one of the checks cannot be processed on time if the checks are processed in the first order based on the estimated processing completion time and a processing deadline of the at least one of the checks; and
outputting, by the computer, information notifying that the checks cannot be processed on time if the checks are processed in the first order in response to determining that the at least one of the checks cannot be processed on time in the first order.

13. The method of claim 7, wherein the first order is based on a first in, first out, processing scheme.

14. The method of claim 7, further comprising
determining, by the computer, whether at least one of the checks cannot be processed on time if the checks are processed in the second order according to the monitored processing deadlines; and
re-sorting, by the computer, the checks based on a second combination of priority indicators in response to determining that the at least one of the checks cannot be processed on time if the checks are processed in the second order.

15. A computer-implemented method for prioritizing checks for electronic check processing, comprising the steps of:
assigning, by a computer, priority indicators to each of a plurality of checks;
selecting, by the computer, a combination of the priority indicators assigned in the assigning; and
ordering, by the computer, the checks based on a sort according to a particular sequence of respective priority indicators of the combination of priority indicators; and
monitoring, by the computer, processing deadlines of the plurality of checks in association with expected processing completion times of the plurality of checks.

16. The method of claim 15, wherein each of the priority indicators comprises information regarding a check characteristic.

17. The method of claim 16, wherein each characteristic comprises at least one of a check value, a check receiving institution, and a check delivery method.

18. The method of claim 15, wherein the step of ordering the checks further comprises the step of identifying, by the computer, checks associated with the combination of priority indicators.

19. The method of claim 15, wherein the step of selecting the combination of priority indicators comprises the step of receiving, by the computer, an input to select the combination of priority indicators.

20. The method of claim 15, further comprising the steps of:
determining, by the computer, an average processing time for each of the plurality of checks;
determining, by the computer, expected processing completion times of each of the plurality of checks based on the average processing time for each of the plurality of checks;
determining, by the computer, that at least one of the checks cannot be processed on time if the checks are processed on a first in, first out, basis based on the estimated processing completion time and a processing deadline of the at least one of the plurality of checks, wherein
the step of ordering the checks is performed in response to a determination that the at least one of the checks cannot be processed on time if the checks are processed on a first in, first out, basis.

21. The method of claim 20, further comprising the step of outputting, by the computer, information notifying that at least one of the checks cannot be processed on time in response to the determination that the at least one of the checks cannot be processed on time if the checks are processed on a first in, first out, basis.

22. The method of claim 15, further comprising
determining, by the computer, whether at least one of the checks cannot be processed on time if the checks are processed in an order based on the sort according to the particular sequence of respective priority indicators; and
re-sorting, by the computer, the checks based on a second combination of priority indicators in response to determining that the at least one of the checks cannot be processed on time.

23. A computer-implemented system for automatically re-clearing an item, comprising:
a check processing module configured to process checks for payment and presentment; and
a prioritization module configured to
assign priority indicators to each of the checks,
monitor processing deadlines of the checks in association with expected processing completion times of the checks,
determine whether all of the checks can be processed on time if the checks are processed by the check processing module on a first in, first out, basis, and
order the checks based on a sort according to a particular sequence of respective priority indicators of a combination of the priority indicators in response to determining that at least one of the checks cannot be processed on time if the checks are processed on a first in, first out, basis according to the monitored processing deadlines, each priority indicator comprising information regarding a characteristic of a respective check to which the priority indicator is assigned, wherein the check processing module and the prioritization module are implemented via one or more processors directed by computer-readable instructions stored on one or more memory devices.

24. The system of claim 23, wherein the prioritization module is further configured to determine whether the checks can be processed on time based on respective expected processing completion times of each of the checks, an average processing time of each of the checks, and respective processing deadlines of each of the checks, and each priority indicator comprises information regarding a characteristic of a respective check to which the priority indicator is assigned, the characteristic comprising at least one of a value of the respective check, a receiving institution associated with the respective check, and a delivery method associated with the respective check.

25. The system of claim 23, wherein the prioritization module is further configured to select the combination of the priority indicators.

26. The system of claim 25, wherein the prioritization module is further configured to identify the checks associated with the combination of priority indicators.

27. The system of claim 23, wherein the prioritization module is further configured to receive an input to select the combination of the priority indicators.

28. The system of claim 23, wherein the prioritization module is further configured to determine an average processing time for each of the checks, determine expected processing completion times of each of the checks based on the average processing time for each of the checks, determine that at least one of the checks cannot be processed on time if the checks are processed on a first in, first out, basis based on the estimated processing completion time and a processing deadline of the at least one of the checks, and order the checks in response to a determination that the at least one of the plurality of checks cannot be processed on time if the checks are processed on a first in, first out, basis.

29. The system of claim 28, wherein the prioritization module is further configured to output information notifying that at least one of the checks cannot be processed on time in response to the determination that the at least one of the checks cannot be processed on time if the checks are processed on a first in, first out, basis.

* * * * *